(12) United States Patent
Filippov et al.

(10) Patent No.: US 7,963,124 B2
(45) Date of Patent: Jun. 21, 2011

(54) FIBER CURE WITH EXTENDED IRRADIATORS

(75) Inventors: Andrey V Filippov, Painted Post, NY (US); Bruce Warren Reding, Wilmington, NC (US); Bradley Kent Shepard, Wilmington, NC (US); David Andrew Tucker, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 269 days.

(21) Appl. No.: 12/276,556

(22) Filed: Nov. 24, 2008

(65) Prior Publication Data

US 2009/0139269 A1 Jun. 4, 2009

Related U.S. Application Data

(60) Provisional application No. 61/004,676, filed on Nov. 29, 2007.

(51) Int. Cl.
*C03B 37/02* (2006.01)
(52) U.S. Cl. ............... 65/435; 65/425; 65/430; 65/529; 65/533
(58) Field of Classification Search .............. 65/430, 65/435, 443, 533, 529; 427/487, 508, 513, 427/558
See application file for complete search history.

(56) References Cited

U.S. PATENT DOCUMENTS

| 4,962,992 | A | 10/1990 | Chapin et al. ............. 350/96.23 |
| 5,104,433 | A | 4/1992 | Chapin et al. .................... 65/3.1 |
| 2003/0059188 | A1* | 3/2003 | Baker et al. ................... 385/128 |
| 2003/0126890 | A1* | 7/2003 | Orita et al. ..................... 65/432 |
| 2003/0159283 | A1* | 8/2003 | White ............................ 29/885 |
| 2006/0051040 | A1* | 3/2006 | Baker et al. ................... 385/128 |

FOREIGN PATENT DOCUMENTS

| JP | 3-12912 | 6/1989 |
| WO | 2008/066661 | 6/2008 |

OTHER PUBLICATIONS

JP 62-003037 Derwent abstract; Sakamot, Katsuji et al.; Apparatus for Drawing Optical Fiber; Jan. 9, 1987.*

* cited by examiner

*Primary Examiner* — Queenie Dehghan
(74) *Attorney, Agent, or Firm* — Svetlana Z. Short (57) ABSTRACT

A method for producing an optical fiber that includes a method for producing an optical fiber, said method comprising: (i) drawing a bare optical fiber from a preform along a first pathway at a rate of at least 10 m/sec; (ii) contacting said bare optical fiber with a region of fluid in a fluid bearing and redirecting said bare optical fiber along a second pathway as said bare optical fiber is drawn across said region of fluid cushion; (iii) coating the bare optical fiber; and (iv) irradiating said coated fiber in at least one irradiation zone to at least partially cure said coating, while subjecting the optical fiber to UV light.

21 Claims, 3 Drawing Sheets

FIBER CURE WITH EXTENDED IRRADIATORS

This application claims the benefit of priority under 35 U.S.C. §119 (e) of U.S. Provisional Application Ser. No. 61/004,676 filed on Nov. 29, 2007.

BACKGROUND OF THE INVENTION

1. Field of the Invention

The present invention relates to methods and apparatus for forming optical fiber and more particularly, to methods and apparatus for forming optical fiber having improved characteristics.

2. Technical Background

Optical fibers have acquired an increasingly important role in the field of communications, frequently replacing existing copper wires. This form of transmission is done by sending a beam of light through an optically clear fiber. Because interference with the light beam or its partial loss during the transmission must be at a minimum to make the use of optical fibers a successful communications technology, the optical fibers must be protected from any environment which will cause loss of signal or distortion of the signal. Coating the fibers is one such technique. The optical fibers are coated to protect the fiber surface from damage which can result from abrasion or water, to maintain the fiber strength, and to prevent transmission loss resulting from fiber bending.

Optical fibers typically contain a glass core, a glass cladding, and at least two coatings, i.e., a primary (or inner) coating and a secondary (or outer) coating. The primary coating which is applied immediately after the fiber is formed serves as a buffer to cushion and protect the glass fiber core when the fiber is bent, cabled, or spooled. The secondary coating is applied over the primary coating and functions as a tough, protective outer layer that prevents damage to the glass fiber during processing and use. Both coatings typically need to be cured (e.g., by irradiation with UV light) to harden and to maintain structural integrity through the fiber life time.

Conventional techniques and manufacturing processes for producing optical fibers generally include drawing an optical fiber downwardly along a linear pathway through the stages of production. However, this technique provides significant impediments to improving and modifying production of the optical fiber. For example, the equipment associated with linear production of optical fibers is usually aligned in a top to bottom fashion thereby making it difficult to add or modify the process without adding height to the overall system. In some cases, addition to the linear production system requires additional construction to add height to a building housing (e.g., where the draw tower is at or near the ceiling of an existing building). Such impediments cause significant costs in order to provide modifications or updates to optical fiber production systems and facilities.

For example, it is difficult to increase the draw speed of the fiber, because the fiber spends less time in UV irradiators that cure fiber coating. However, adding more irradiators or larger irradiators to the linear production system is difficult. There is typically little space available for adding additional irradiators (to accommodate a fiber that travels faster through the irradiator), without adding height to the overall system. Because adding height to an existing system can add significant cost to the system, fiber draw systems in which space is available for additional irradiators without necessitating an increase in overall system height are desired.

SUMMARY OF THE INVENTION

One aspect of the invention includes a method for producing an optical fiber, said method comprising:

(i) drawing a bare optical fiber from a preform along a first pathway; (ii) contacting said bare optical fiber with a region of fluid in a fluid bearing and redirecting said bare optical fiber along a second pathway as said bare optical fiber is drawn across said region of fluid cushion; (iii) coating the bare optical fiber; and (iv) irradiating said coated fiber in at least one irradiation zone to at least partially cure said coating, while subjecting the optical fiber to UV light. Preferably, the bare optical fiber is drawn at a rate of at least 10 m/sec.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings.

The invention provides new system(s) and method(s) for producing optical fibers along nonlinear paths through the use of fluid bearings. Embodiments of the present invention are herein described in detail in connection with the drawings of FIGS. 1-5, wherein like numbers indicate the same or corresponding elements throughout the drawings.

Higher draw rates reduce the cost of manufacturing optical fiber. When coating an optical fiber it is important to produce, at high draw rates, uniform, strong coatings that can protect the fiber core. However, when a freshly coated fiber is not provided with a sufficient dwell time inside irradiators (for example, when the fiber is drawn too fast through the irradiation devices), the fiber coating may not cure sufficiently and the fiber will suffer from defects such as delaminating coatings, non-uniform coatings, weaker coatings, or undesirable changes in fiber's optical parameters. To combat these defects, the optical fiber is irradiated in accordance with the invention by maintaining the optical fiber within an irradiation zone for a sufficient time to be cured. One advantage of the present invention is that it enables a faster draw speed and provides a longer irradiation zone(s) to sufficiently cure the fiber coating(s).

The present invention includes improved methods for irradiating drawn optical fibers, to reduce defects that are associated insufficient coating cure. As used herein, "irradiating" exposing a coated fiber is moved to irradiation, preferably with UV light, which at least partially cures the coating. As will be better understood from the description that follows, the methods and apparatus of the present invention may allow for relatively high speed, high tension formation of drawn, doped, optical glass fibers having well cured coating as compared to prior art methods for making fibers.

To achieve the foregoing, an embodiment of the present invention includes a system and a method for producing an optical fiber including drawing the fiber from a heated glass source, and contacting the bare optical fiber with a region of fluid cushion of a fluid bearing and redirecting the bare optical fiber along at least a second pathway as the bare optical fiber is drawn across the region of fluid cushion.

According to further embodiments of the invention, a method of manufacturing an optical fiber at high speed is provided that comprises the steps of drawing the optical fiber from a heated glass supply, such as optical fiber preform, at a draw rate of greater than or equal to 10 m/s, preferably greater than or equal to 20 m/s, and even more preferably greater than or equal to 30 m/s, followed by cooling step wherein the optical fiber is preferably cooled to 200° C. or less, more preferably to less than 100° C., and even more preferably to less than 80° C.

As used herein, the term "irradiation zone" refers to an area downstream from a draw furnace where coated optical fiber is irradiated to at least partially cure the fiber coating(s), for example by UV light. In a preferred embodiment, the average irradiation rate (also referred as average power herein) of the fiber in the irradiation zone may be less than 400 W/cm, including less than 300 W/cm, preferably more than 80 W/cm, for example 110 W/cm to 280 W/cm. For example, the average power may be 300 W/in (about 118 W/cm) or 500 W/in (about 195 W/cm), or 600 W/in (about 240 W/cm). The term "UV light" refers to light having a wavelength of from about 150 nm to about 420 nm.

The phrase "bare optical fiber" as used herein means an optical fiber directly drawn from a preform and prior to applying a protective coating layer to its outer surface (e.g., prior to the bare optical fiber being coated with a polymeric based material). The present invention provides flexibility by allowing the bare optical fiber to be transported along nonlinear pathways through stages of production prior to a protective coating being applied theret thus providing more vertical space for additional (or longer) irradiators. In addition, as discussed later herein, systems and methods of the embodiments of the present invention not only provide nonlinear pathways, but can also assist in cooling and further processing of the optical fiber during production.

Figure 1:
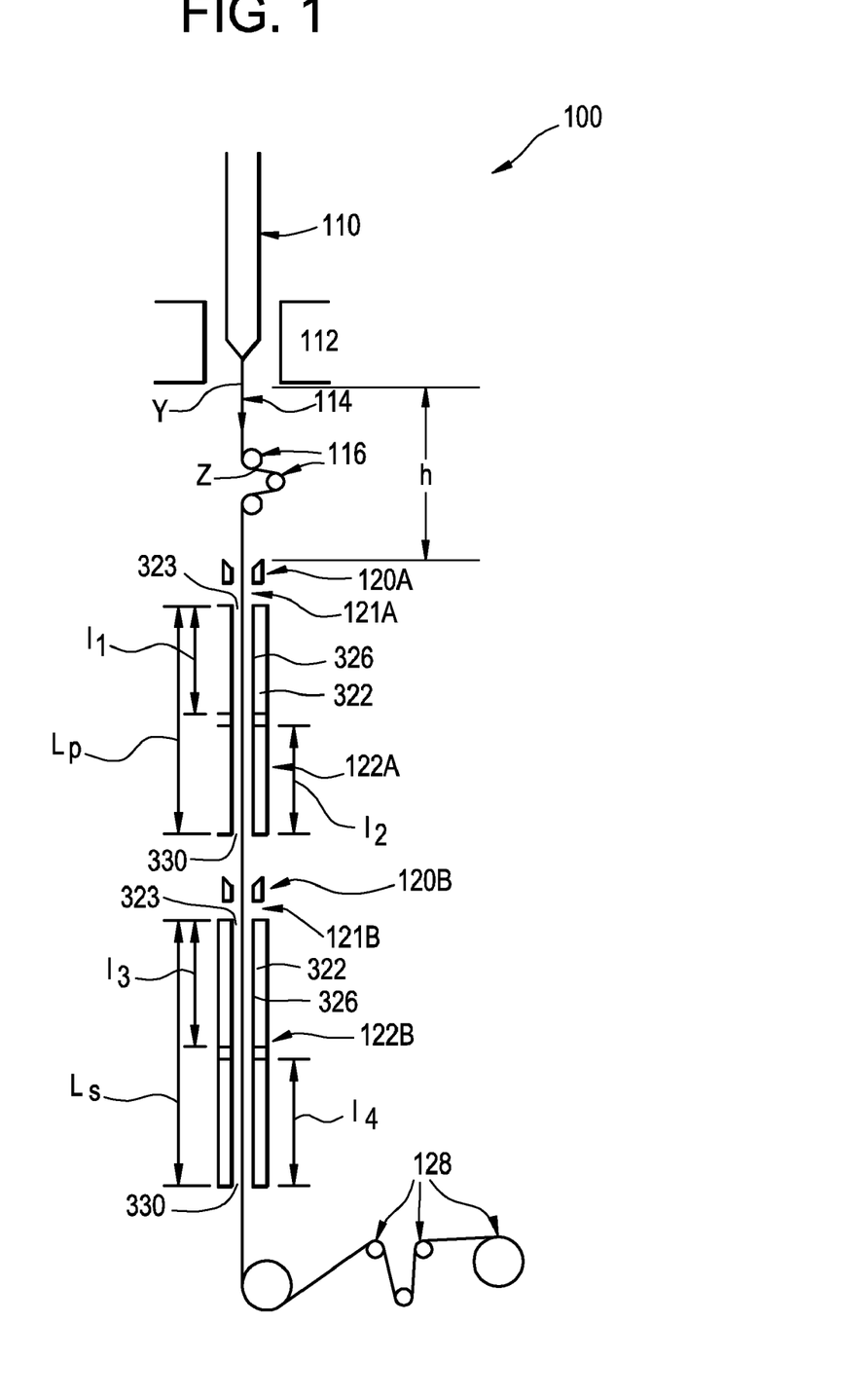
FIG. 1 illustrates an optical fiber production system.

Referring to FIG. 1, an example of the system 100 for producing optical fibers is illustrated. In the embodiment shown in FIG. 1, a preform 110 is placed in a furnace 112 and fiber is drawn therefrom to create a bare optical fiber 114. Preform 110 may be constructed of any glass or material suitable for the manufacture of optical fibers. Once bare optical fiber 114 is drawn from a preform 110 and leaves furnace 112, the bare optical fiber contacts at least one stationary fluid bearing 116 (shown in FIG. 1 as a plurality of fluid bearings) and shifts from moving along a substantially first or vertical pathway (Y) to second pathway (Z). The second pathway (Z) may be oriented approximately horizontally or orthogonal to the first path, but the bearings 116 can redirect an optical fiber along any nonlinear pathway prior to a protective coating being applied thereto. The optical fiber 114 may be directed, via at least one stationary fluid bearing(s) 116 to pass through an optional cooling mechanism 118, or can be cooled to a desired temperature by the stationary fluid bearing(s) 116. It is noted that the optional or additional cooling mechanism 118 (not shown) can be any mechanism known in the art for cooling optical fiber. Preferably, the cooling mechanism 118 is filled with a gas that can facilitate cooling of the fiber at a rate faster than cooling in air.

If desired, optional additional fluid bearing(s) can be used to transport the bare optical fiber 114 from the substantially horizontal pathway (Z) generated by the alignment of the first and second bearings 116 back to the substantially vertical pathway (Y) (or any other third pathway). In the embodiment illustrated in FIG. 1, optical fiber 114 passes through three fluid bearings 116 and is then coated and cured. However fewer, or more fluid bearings 116 may also be utilized.

The method of curing the compositions of primary and secondary coatings of the present invention can be thermal, chemical or radiation induced depending upon the nature of the coating composition(s) and the optional polymerization initiator being employed. Radiation for purposes of this application means the application of infrared, visible light, atomic radiation, actinic radiation and ultraviolet rays, as well as ionized rays such as X-rays, electron beam, alpha-rays, beta-rays, gamma-rays and the like. "Cure", "curable", and "cured" for purposes of this application includes partially, substantially or totally cured coatings and compositions for coatings which can be partially, substantially or totally cured. The primary and secondary coating compositions are preferably cured with radiation, and more preferably ultraviolet radiation (although it is understood that both the primary and secondary coatings can be cured at once after application of both of the coatings). If ultraviolet (UV) radiation is used, preferably the coatings are is cured at a dose level of at least about 0.2 J/cm$^2$, more preferably from about 0.5 to about 1.0 J/cm$^2$.

A coating material commonly used in the manufacture of optical fibers is a urethane acrylate-based composition which is curable by exposure to ultraviolet (UV) light. This material is applied to the surface of the fiber in a liquid state and is subsequently exposed to UV light for curing. The coating material may be applied in one or more layers, with a two-layer coating system being a preferred embodiment. The primary coating is usually applied directly to the surface of the fiber, and the secondary coating is applied over the primary coating. It the embodiment of FIG. 1, after the fiber leaves the last fluid bearings 116 it is directed to primary coater unit 120A (i.e., primary coating) where a primary protective coating layer 121A is applied to the outer surface of the bare optical fiber 114. After leaving the primary coater unit 120A, the optical fiber with the wet protective layer 121A (no longer being bare) will be cured by at least one irradiator 122A that typically contains at least one UV light source. Fiber 114 then passes through secondary coater unit 120B where it is coated with a layer 121B of secondary coating material that is cured in at least one irradiator 122B which is similar to irradiator(s) 122A.

The fiber can go through a variety of other processing stages within the system (not shown). Drawing mechanisms 128 (also referred to as tensioning system herein) are used to provide the necessary tension on the optical fiber as it is drawn throughout the entire system as shown in FIG. 1 and eventually wound onto a fiber storage spool (not shown).

Additional conventional process steps may be included, such as non-contact diameter measurement apparatus, further fiber cooling apparatus, and spool winding apparatus. Such additional process steps are conventional and not shown for clarity.

As the optical fiber 114 is transported over the fluid bearings 116 (described later herein), the region of fluid cushion on each fluid bearing 116 cools the bare optical fiber 114. For example, referring to FIG. 1, the optical fiber 114 exiting the draw furnace can have a temperature of around 1000° C. to 3000° C. (e.g., 1000° C. to 2000° C.) as it enters the fluid bearings 116. Because the fluid bearing employs a moving fluid stream which supports the optical fiber, the optical fiber is cooled at a rate which is faster than the fiber would cool in non-moving air at room temperature, such as is present immediately outside the draw furnace. The greater the temperature differential between the optical fiber and the fluid in the fluid bearing (which is preferably room temperature air), the greater the ability of the fluid bearing to cool the optical fiber 114. In another embodiment, the fluid emitted through the fluid bearings 116 can actually be cooled so as to cool the optical fiber at an even faster rate. The fluid associated with the region of fluid cushion can provide sufficient cooling to the optical fiber 114 so that it can be directly transported to the coating unit 120 and a protective layer can be applied to the outer surface of the bare optical fiber 114 to produce a coated fiber 121. In one embodiment, the region of fluid cushion of the fluid bearing 116 can include a fluid that is nonreactive relative to the bare optical fiber 114 (e.g., air, helium). The fluid enables cooling of the optical fiber to a desired temperature, prior to the fiber being coated.

In addition to providing cooling, the arrangement of FIG. 1 utilizing multiple fluid bearings 116 can provide better stability when shifting the bare optical fiber 114 from a substantially linear arrangement (Y) to a substantially nonlinear arrangement (Y+Z). Without intending to be limited by theory, by having multiple fluid bearings 116 arranged adjacent to each other, the precision required to have the optical fiber 114 move from one region of fluid cushion to the next can be more easily controlled. Of course, it should be understood that any number of bearing assemblies (discussed later herein), including one bearing assembly, arranged in any order and to provide any number of desired pathways can be used to produce optical fibers.

Figure 2:
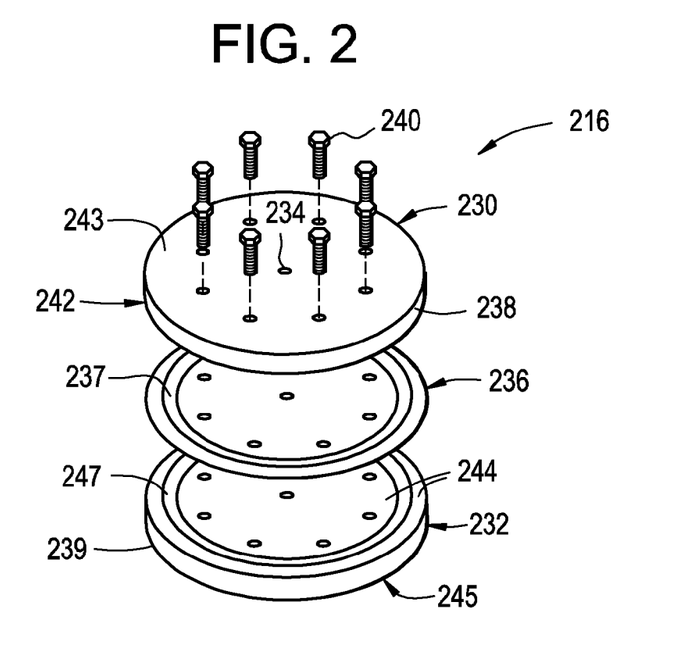
FIG. 2 illustrates an exploded view of a fluid bearing for use in an optical fiber production system.
Figure 3:
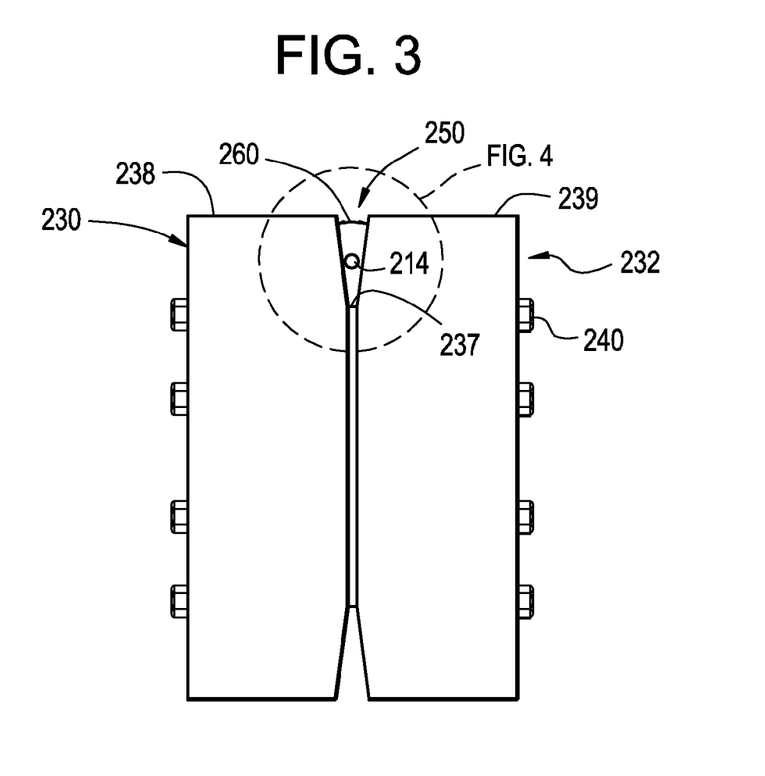
FIG. 3 illustrates a side plan view of a fluid bearing having a tapered region for an optical fiber production system.

Heretofore, systems and methods for producing optical fibers in nonlinear pathways have been described. As described herein, such systems and methods can include incorporation of one or more bearing assemblies. FIGS. 2 and 3 illustrate an embodiment of a bearing assembly 216 that can be used for producing an optical fiber as described herein. In the embodiment shown in FIGS. 2 and 3, the bearing assembly 216 (referred to sometimes as "fluid bearing") includes a first plate 230, a second plate 232, an inner member 236 and at least one opening 234 in at least one of the first and second plates. The first plate 230 and the second plate 232 can be made of metal and include an arcuate outer surface 238, 239 and can be positioned on opposite sides of each other. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 4 (discussed later herein). At least one opening 234 passes through at least one of the first plate 230 and the second plate 232. As shown in FIG. 2, the opening 234 of the first plate 230 and the second plate 232 allow for fluid (e.g., air, helium or other desired gas or liquid) to be fed through the bearing assembly 216 so that the fluid can exit the bearing assembly 216 at the fiber support channel 250 which is formed between the first plate 230 and the second plate 232. (See FIGS. 3 and 4).

In addition, as shown in the embodiment of FIG. 2, the bearing assembly 216 can include an inner member 236 positioned between the first plate 230 and the second plate 232. This inner member 236 (e.g., a shim 237) is configured to aid in directing the fluid to the region between the outer surfaces 238, 239 of the first plate 230 and the second plate 232 such that the fluid exits the fiber support channel 250 having a predetermined flow direction. The inner member 236 rests between the first plate 230 and second plate 232 to provide a gap there between. The inner member 236 directs the fluid such that it exits the fiber support channel 250 having a predetermined flow direction. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber. (See FIG. 5, described later herein).

As shown in FIG. 3, the fiber support channel 250 formed between the outer surfaces 238, 239 of the first plate 230 and the second plate 232 can be tapered where the fluid exits between the first plate 230 and the second plate 232. In another embodiment however, fiber support channel 250 can include a parallel or reverse tapered shape, for example. In addition, the opening 260 within the tapered fiber support channel 250 is variable depending on where the optical fiber 214 is vertically positioned. Preferably, the opening 260 and the fiber support channel 250 is configured so that, for the particular draw tensions and draw speeds employed and flow rates of the fluid through the opening 260, the optical fiber is maintained in a section of fiber support channel 250 which is less than 500, more preferably less than 400, even more preferably 300, and most preferably less than 200 microns wide, for a fiber having a typical outer diameter of 125 microns. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

Figure 4:
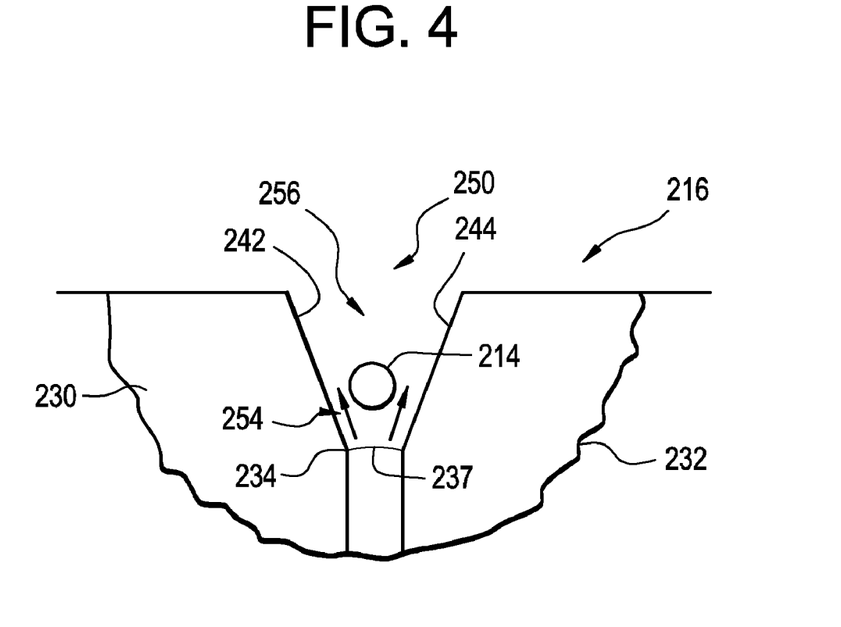
FIG. 4 illustrates an enlarged view of a portion of FIG. 3 of a region of a fluid bearing.
Figure 5:
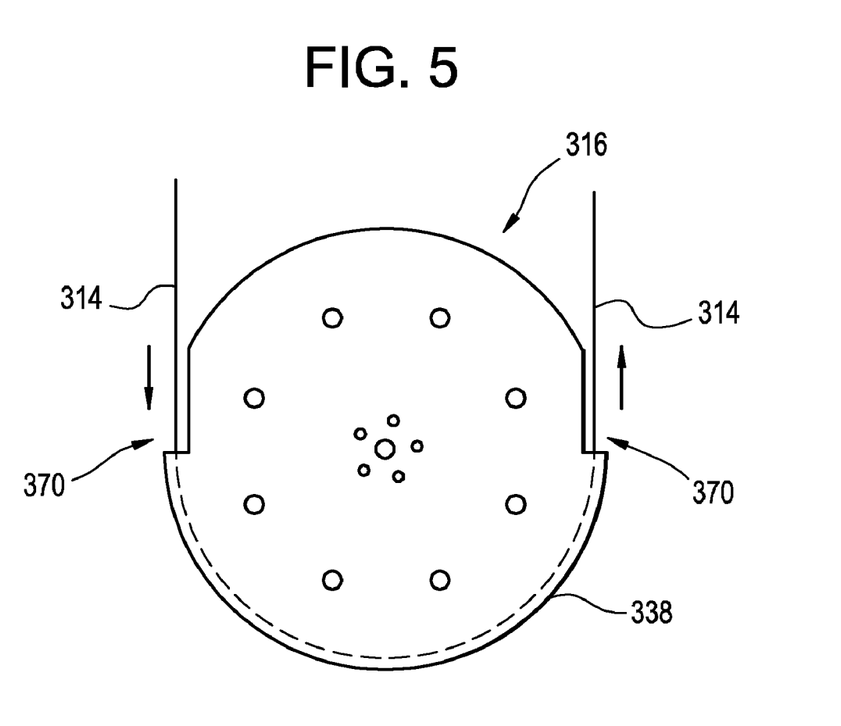
FIG. 5 depicts a front plan view of a portion of a fluid bearing.

FIG. 4 is an enlarged view of a portion of FIG. 3 which more clearly shows the fiber support channel 250 having a region of fluid 254 that contacts the optical fiber 214 as it is transported across the fluid bearing assembly 216 and prevents substantial contact of the optical fiber with the mechanical components of the fluid bearing assembly 216. As depicted in FIG. 4, fluid 254 (e.g. air) exits the fiber support channel 250 from within the bearing assembly 216 and around optical fiber 214 and provides the region of fluid 254 beneath the optical fiber 214 which results in a positive pressure below the fiber and thus acting on and supporting the bottom of the fiber. Pressure can be optimized so that the fiber 214 is positioned within the fiber support channel 250 formed between the first plate 230 and the second plate 232 of the fluid bearing assembly 216. Particularly, the fluid 254 exiting the bearing assembly 216 at fiber support channel 250 (i.e., beneath fiber 214) can have a constant fluid flow rate which can maintain or support the optical fiber 214 at a certain position within this fiber support channel 250. A high enough fluid pressure is provided to fiber support channel 250 to support the optical fiber 214 and maintain the optical fiber at a desired location within the fiber support channel 250 as the optical fiber 214 moves through the fluid bearing assembly 216.

In the embodiment illustrated in FIGS. 3 and 4, for ease of viewing, the tapered angle has been exaggerated in the illustration from what is a preferred angle of taper opening to fiber support channel 250. In reality, at least one of and preferably both of the opposing surfaces of support channel 250 are each inclined, preferably at an angle greater than 0 and less than 10 degrees, more preferably between 0.3 and 7 degrees, and most preferably between 0.4 and 3 degrees, so that the width 260 of the top or outer portion of fiber support channel 250 is wider than the width 260 of the bottom or inner portion 237 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 and injecting the fluid into the slot formed by fiber support channel 250 so that the fluid enters the narrower inner portion of fiber support channel 250 and exits the wider outer region of fiber support channel 250, the cushion of fluid emitted through channel 250 will cause the fiber to be self locating within the depth of the channel 250. For example, for a given fluid flow, if the fiber draw tension is increased, the fiber will move downward in the channel 250 until the gaps between the fiber 214 and channel walls are small enough that the pressure in region 237 is high enough to correctly counteract the new higher tension. If the fiber draw tension is decreased, the fiber will move upwardly within the channel 250 until the gaps between fiber 214 and channel walls are large enough that the pressure in region 237 is small enough to correctly counteract the new, lower tension. Tapering the channel 250 thus enables the channel 250 to work with a wider range of draw tensions. Otherwise, if channel 250 as shown was not tapered and the draw tension was decreased, the fiber would travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example as the fiber gets closer to either opposing surface of channel 250, the velocity of the air will increase nearest one surface and decrease nearest the other. According to the Bernoulli effect, an increase in fluid velocity occurs simultaneously with a decrease in pressure. As a result, the greater pressure caused by the decreased fluid flow near one surface will force the fiber back into the center of channel 250. Thus, in the preferred embodiments, the fiber is centered within the fiber support channel 250 at least substantially via the Bernoulli effect due to a fluid stream which is passing around the fiber and out of the fiber support channel 250 while the fiber is being drawn. Notably, such centering occurs without having to utilize any flow of fluid which would impinge upon the fiber from the side thereof, e.g., there are no jets of fluid flow employed which emanate from sidewalls of channel 250. The velocity of the fluid stream traveling through the slot is preferably adjusted to maintain the fiber so that the fiber is located entirely within a tapered region of the slot 250. In the presently described embodiment, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated, the fluid stream is preferably provided by a single fluid stream which enters fiber support channel 250 via the narrower inner portion of fiber support channel 250 and exits via the wider outer region of fiber support channel 250. In this way, the fiber can be positioned entirely within the slot formed by fiber support channel 250 such that the fiber floats between the narrowest and widest portion of the slot. By employing a tapered fiber support channel 250 and injecting the fluid flow through the region 250 in this manner, it is possible to retain the fiber in a region of said slot formed by fiber support channel 250 wherein the slot has a width which is between 10 to 150, more preferably 15 and 100, and most preferably between about 24-70 microns greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the fluid flow. Such a means for releasing pressure can be achieved in the form of a tapered channel design, as described above. Additional means for reducing pressure are disclosed in U.S. Patent Application Ser. No. 60/861,587, the entire disclosure of which is hereby incorporated by reference in its entirety.

The fluid bearings described herein enable the optical fiber to travel along the region of fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing is capable of maintaining the fiber within the region without mechanical contact through a range of draw tensions without active control of the fluid flow.

Referring to FIGS. 3 and 4, the fluid flow can be important to prevent the optical fiber 214 from moving towards the bottom of the fiber support channel 250 and coming in contact with the shim 237 or the sides of the fiber support channel 250. This is particularly important when the optical fiber is still bare so that the fiber quality is not compromised by the mechanical contact with the bearing assembly. Moreover, it is believed the closer the optical fiber 214 is positioned relative to the bottom of the fiber support channel 250, the higher the pressure needs to be within the fiber support channel 250 to maintain the optical fiber 214 at the desired location. As is evident, the taper in channel sides will cause the gaps between the channel sides and the fiber to be smaller, causing this necessary higher pressure.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the fluid exiting the region of the fluid bearing be sufficient to maintain the optical fiber at the desired location for the particular fiber draw speed and draw tension employed.

For example, in an embodiment that utilizes a fiber support channel 250 having a width of about 127 microns at the innermost section between plates 230 and 232 and approximately 380 microns at the outermost section, the fluid flow rate can be from about 0.5 L/sec to more than 5 L/sec. Such a configuration and fluid flow can result in local fluid velocities around the optical fiber as high as 800 km/hour or even higher. Thus, in some embodiments the maximum fluid velocities around the fiber employed in the fiber support channel 250 are higher than 100, higher than 200, higher than 400, and possibly even higher than 600 km/hour. In some embodiments, maximum fluid velocities around the fiber employed in the fiber support channel 250 have been higher than 900 km/hour. For example, applicants have successfully employed 1000 km/hour fluid flow around the fiber in the fiber support channel 250. However, the methods disclosed herein are certainly not limited to these fluid velocities, and in fact the fluid velocity preferably can be chosen to result in the fiber being located at a desired location within fiber support channel 250, depending on draw conditions (e.g. draw speed, draw tension, etc.) and fluid bearing design. In another embodiment, the fluid flow rate can be from about 3 L/sec to about 4 L/sec. Of course, any fluid rate sufficient to maintain the optical fiber at the desired location at a given draw tension can be utilized. The use of such high fluid flow velocities can greatly facilitate cooling of the optical fiber. The larger the difference between the temperature of the fiber and the temperature of the fluid being emitted through the fluid bearing, and the higher the fluid flow velocity, the greater the amount of cooling that can be achieved. In some embodiments, the temperature of the fiber entering the fluid bearing can be greater than 100° C., greater than 500° C., greater than 1000° C., and even greater than 1500° C. higher than the temperature of the fluid being emitted through and supporting the fiber within the fluid bearing. Employing such temperature differentials in the embodiment discussed above, with an optical fiber draw speed of greater than 10 meters per second, and preferably greater than 20 meters per second, a fiber having a temperature upon entry into the fluid bearing of 1100° C. may be cooled as much as 1000° C., i.e., to about 100° C. using a room temperature (i.e., about 20° C.) fluid (preferably air) by passing the fiber through the fluid bearing to make the fiber achieve a 180 degree turn in direction. This very significant amount of cooling illustrates the capability of using fluid bearings such as are disclosed herein to cool the fiber greater than 50° C., 200° C., 500° C., 700° C., and even greater than 900° C. Perhaps even more significant is that such fiber cooling amounts can be achieved over fiber distance (i.e. the circumferential distance over which the fiber is exposed to the fluid cushion of the fluid bearing) of less than 3, more preferably less than 2, and most preferably less than 1 meter. However, greater or lesser distances of fiber/fluid cushion contact can be employed, depending on desired results and the layout of the manufacturing area. The significant cooling capability of the fluid bearings disclosed herein enables the potential elimination of helium cooling devices from the optical fiber draw process altogether.

The radius of the fluid bearings 116 is not critical. In some embodiments, fluid bearing is constructed to result in a fiber turn radius of from about 8 to 16 cm. Larger or smaller radius fluid bearings can be employed, or additional fluid bearings can be employed, for example, depending on whether greater cooling is desired (in which case larger radius fluid bearing may be preferred) or the constraints of the fiber draw process.

The glass preform 110 is preferably formed of a doped silica glass. The preform 110 may be formed such that either the core or the cladding (if present) of the drawn fiber is doped, or such that both the core and the cladding of the drawn fiber are doped. The silica glass may be doped with one or more of germanium, fluorine, phosphorous or chlorine, or combinations thereof, for example. Other suitable dopants may be used as well. Germanium doped fibers, were found by the inventors to exhibit heat aging under most manufacturing conditions. Methods and apparatus for forming the preform 110 are well known and are readily appreciated by those of skill in the art. Such methods include IVD, VAD, MCVD, OVD, PCVD and the like.

Examples of suitable primary and optional secondary coating compositions of the present invention are described and produced as follows. The primary coating composition comprises an oligomer wherein the oligomer is formed from a reaction comprising a polyol having "m" hydroxyl functional groups, wherein "n" hydroxyl groups of said polyol are terminated in forming the oligomer and "m" is greater than "n" such as acrylate or a methacrylate, for example. Preferably, the primary coating composition also includes at least one monomer, and at least one photoinitiator. Additionally, the primary coating composition of the present invention can optionally include any number of additives, for example, adhesion promoters, anti-oxidants, catalysts, lubricants, co-monomers, low-molecular weight non-crosslinking resins, and stabilizers. Some additives (e.g., chain transfer agents) can operate to control the polymerization process, thereby affecting the physical properties (e.g., modulus, glass transition temperature) of the polymerization product formed from the primary coating composition. Other additives can affect the integrity of the polymerization product of the primary coating composition (e.g., protect against de-polymerization or oxidative degradation).

The secondary coating composition typically contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference.

Preferably, a photoinitiator is used in the primary and secondary coating compositions. The photoinitiator should be suitable to cause polymerization (i.e., curing) of the composition after its application to a glass fiber. For most acrylate-based coating formulations, photoinitiators, such as the ketonic photoinitiating and/or phosphine oxide additives, are preferred. When used in the compositions of the present invention, the photoinitiator is present in an amount sufficient (e.g., 0.5 to 10 wt %) to provide rapid ultraviolet curing.

The photoinitiator provides reasonable cure speed without causing premature gelation of the coating composition. A desirable cure speed is any speed sufficient to cause substantial curing of the coating materials (i.e., greater than 85%, preferably greater than 90%, more preferably 95%) of the coating composition. As measured in a dose versus modulus curve, a cure speed for coating thicknesses of about 25 to about 100 μm is preferably less than about 1.0 J/cm$^2$, and more preferably less than about 0.5 J/cm$^2$.

Suitable photoinitiators for the primary and secondary coating compositions include by way of example 1-hydroxy-cyclohexylphenyl ketone (e.g., Irgacure 184 available from Ciba Specialty Chemical (Hawthorne, N.Y.), bis(2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl) diphenyl phosphine oxide (Lucerin TPO, available from BASF (Munich, Germany)), ethoxy (2,4,6-trimethylbenzoyl) phenyl phosphine oxide (Lucerin TPO-L from BASF), and combinations thereof.

The irradiators 122A, 122B preferably include a housing 322 surrounding the fiber and having an aperture 323 situated and serving as the exit port of fiber 114. An cylindrical sleeve-like walls 326 (which may be, for example, formed of a reflective material) extends through the irradiator 122A, 122B and defines a passage 330 therein. The walls 326 of each irradiator surrounding passage 330 include one or more UV sources 332 (not shown) that provide the desired radiation within at the irradiation zone. Several irradiators may be utilized after each coating step to provide the irradiation zone of the desired length. The irradiators are adapted to receive and guide the optical fiber 114. However, it will be appreciated that other housing configurations and components may also be employed.

The passage 330 preferably has a diameter dimension D of greater than 15 mm at all places along its length, and preferably between about 15 mm and 30 mm, to allow the drawn fiber to readily drop therethrough. The term the "length L" of irradiation zone is defined as the length of total irradiation zone, i.e., $L=Lp+L_s=\Sigma l_i$, where $L_P$ is the length of the primary irradiation zone, Ls is the length of the secondary irradiation zone, $l_i$ is length of the irradiation zone provided by each individual irradiator device 122$_i$, and i is the number of irradiating devices utilised. For example, $l_i$ may be 10 to 50 cm long, for example 25 cm. If the system utilizes a total of 4 irradiating devises (2 in irradiation zone and 2 in the secondary irradiation zone), each 25 cm long, than L=100 cm. Similarly, if the system utilizes a total of 6 irradiating devises, each 25 cm long, than L=150 cm. Assuming that the UV power incident on the fiber does not change, the faster the drawing speed, the faster is the fiber moving through each irradiating device, thus either more, or longer irradiating devices are needed to provide the same cure to a faster moving fiber. The length L of the total irradiation zone is preferably between about 1 m and 10 m, and more preferably between about 1.5 m and 8 m, for example between about 3 m and 7 m. The preferred length L will depend on the draw speed of the fiber 114 and examples of ranges of a draw speed are from about 10 m/s to about 100 m/s, such as from about 10 m/s to 75 m/s, including from about 20 m/s to 50 m/s. The presence of fluid bearings 116 (as shown in FIG. 1), downstream from optical fiber forming apparatus 300 enables the irradiation zone to have a longer length L (where L=Lp+Ls), such as irradiation zone having a length L of at least 1.5 meters, more preferably at least 2.5 or 3 meters, including an irradiation zone having a length L of at least 4 meters, and further including an irradiation zone having a length L of at least 5 meters. In at least one embodiment, the total residence time of the fiber in the irradiation zone is less than 1 second, preferably less than 0.5 sec, preferably between 0.03 to 0.2 sec.

Preferably, the overall system for forming the optical fiber is housed in an area protected from outside elements, such as a building or factory having a roof height of between about 10 and 30 meters. Preferably the vertical distance h between the a furnace 112 and the coating unit 120A is less than 6 m, more preferably less than 5 m, even more preferably less than 4 m (for example, less than or equal to: 3 m, 2.5 m, 2 m, 1.5 m, 1 m, 0.75 m, or 0.5 m). In at least one embodiment, the total length L of the (total) irradiation zone can extend at least 10% of the vertical height of the overall system, including at least 20% of the vertical height of the overall system. In addition, the length L of the irradiation zone can extend at least 25% of the vertical distance between the roof and the floor of a building or factory in which the overall system is housed, including at least 30% of the vertical distance between the roof and the floor of a building or factory in which the overall system is housed.

The tensioning station 128 may be any suitable device for controlling the tension in the drawn fiber 114. Preferably, the tensioning device includes a microprocessor which continuously receives input from one or more fiber tension and/or diameter sensors (not shown) and is operative to apply the tension of the fiber 114 as needed. In a preferred embodiment, the tension commanded is based upon controlling the fiber diameter to equal a set diameter stored in memory.

Also, as the fiber 114 passes through the passage 330, the fiber 114 is maintained inside irradiator(s) at a selected tension $F_T$. Preferably, the tension $F_T$ is between about 25 and 200 grams. More preferably, the tension $F_T$ is between about 60 and 180 grams. Most preferably, the tension $F_T$ is between about 90 and 150 grams. The total length L of the primary and secondary irradiation zones is selected such that primary and secondary coatings are sufficiently cured (i.e., greater than 85%, preferably greater than 90%, more preferably 95%) of the coating composition is cured. The fiber remains within the irradiators for a selected resident irradiation time $t_T$, which, as stated above is preferably less than 0.5 sec. Preferably, the resident time within the primary irradiation zone is less than 0.2 sec, and the resident time within the primary irradiation zone is also less than 0.2 sec. More preferably, the resident time within the primary irradiation zone is less than 0.1 sec, and the resident time within the primary irradiation zone is also less than 0.1 sec.

The presence of fluid bearings 116 (as shown in FIG. 1), downstream from optical fiber furnace enables the irradiation zone to have a longer length L for example of at least 1.5 meters. According to some embodiments, in operation, methods in accordance with embodiments of the invention can comprise the steps of: (i) drawing the optical fiber from a heated glass supply, such as an optical fiber preform at a draw rate of greater than or equal to 10 m/s, preferably greater than or equal to 20 m/s, including greater than or equal to 30 m/s, and preferably greater than 40 m/s, followed by (ii) coating the fiber with a primary coating composition and irradiating the primary coating by maintaining the optical fiber in a primary irradiation zone for a residence time, which in at least one embodiment can be greater than 0.005 seconds and less than 0.25 seconds), and in other embodiments can be at least 0.01 seconds (such as from 0.02 seconds to 0.4 seconds), (iii) by coating the fiber with a secondary coating composition and irradiating at least the secondary coating by maintaining the optical fiber in a secondary irradiation zone for a residence time, which in at least one embodiment can be greater than 0.005 seconds and less than 0.25 seconds and in other embodiments can be at least 0.01 seconds (such as from 0.02 seconds to 0.4 seconds), wherein (a) the length Lp of the primary irradiation zone is at least 0.5 meters, such as at least 1 meter or at least 1.5 meters, preferably at least 2 meters, more preferably at least 2.5 meters, more preferably at least 3 meters, for example 4 or 5 meters; (b) the length Ls of the secondary irraditing zone is at least 0.5 meters, such as at least 1 meter, or at least 1.5 meters, preferably at least 2 meters, more preferably at least 3 meters, for example 4 or 5 meters; and (c) the total length L=Lp+Ls is at least 1 meters, more preferably at least 2 meters, even more preferably at least 2.4 meters or 2.5 meters (e.g., 2.7 m, 2.8 m), preferably at least 3 meters (e.g., 3.3 m, 3.5 m, 3.75 m), preferably as at least 4 meters, for example 4.5, 6, 7 or 8 meters. For example, the total length L=Lp+Ls may be 2.2 m<L<3.7 m, or 2.4 m<L<4.5 m.

Drawing at high speed (more than 20 m/sec) enables production of large volumes of the optical fiber which is then coated and irradiated in accordance with aspects of the present invention to produce a high quality coated fiber.

Examples 1-14, representing various embodiments of the present invention, are set forth in Table 2. These examples correspond to a coating cure of 85%-95%, incident UV radiation on fiber with power of 118 W/cm, and show the treatment of optical fiber through a primary and a secondary irradiation zone having the corresponding indicated length Lp, Ls in meters and a total length L=Lp+Ls, as well as the indicated draw speed of the optical fiber in meters per second. It s noted that although in these examples the irradiation time in primary coating irradiation zone is the same as the irradiation time in secondary, coating irradiation zone, irradiation time for the coatings will depend on specific coating compositions and does not have to be the same.

TABLE 2

| Example | Fiber Draw Speed (m/s) | Primary Irradiation Zone Length Lp (meters), and Number of Primary Irradiators | Secondary Irradiation Zone Length Ls (meters), and Number of Secondary Irradiators | Irradiation Zone Length L (meters) |
|---|---|---|---|---|
| 1 | 10 | 0.3 m; 1 | 0.3 m; 1 | 0.6 m |
| 2 | 15 | 0.6 m; 2 | 0.6 m; 2 | 1.2 m |
| 3 | 20 | 0.9 m; 3 | 0.9 m; 3 | 1.8 m |
| 4 | 25 | 0.9 m; 3 | 0.9 m; 3 | 1.8 m |
| 5 | 30 | 1.2 m; 4 | 1.2 m; 4 | 2.4 m |
| 6 | 35 | 1.2 m; 4 | 1.2 m; 4 | 2.4 m |
| 7 | 40 | 1.5 m; 5 | 1.5 m; 5 | 3.0 m |
| 8 | 45 | 1.5 m; 5 | 1.5 m; 5 | 3.0 m |
| 9 | 50 | 1.8 m; 6 | 1.8 m; 6 | 3.6 m |
| 10 | 55 | 2.1 m; 7 | 2.1 m; 7 | 4.2 m |
| 11 | 60 | 2.1 m; 7 | 2.1 m; 7 | 4.2 m |
| 12 | 70 | 2.4 m; 8 | 2.4 m; 8 | 4.8 m |
| 13 | 75 | 2.7 m; 9 | 2.7 m; 9 | 4.8 m |
| 14 | 100 | 3.6 m, 12 | 3.6 m, 12 | 7.2 m |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for producing an optical fiber, said method comprising:
    drawing a bare optical fiber from a preform along a first pathway at a draw speed of at least 20 m/sec;
    contacting said bare optical fiber with a region of fluid cushion in a fluid bearing and redirecting said bare optical fiber along a second pathway as said bare optical fiber is drawn across said region of fluid cushion;
    coating the bare optical fiber;
    irradiating said coated fiber in at least one irradiation zone to at least partially cure said coating, while subjecting the optical fiber to UV light, wherein said irradiation zone has a total length L, and wherein L is at least 1.5 meters; and
    wherein the step of drawing the fiber occurs along a first pathway and the method further comprises: contacting the bare optical fiber with a region of fluid in a fluid bearing, said fluid bearing comprising a channel, said channel defined by two sidewalls, the fiber being retained between said two sidewalls during said drawing step, said two sidewalls defining an inlet below said fiber, said fiber positioned a distance one or more fiber diameters from said inlet, causing said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and redirecting the fiber along a second pathway as said bare optical fiber is drawn across said region of fluid cushion.

2. The method of claim 1, wherein said total length L is at least 3 meters.

3. The method of claim 1, wherein said total length L is at least 5 meters.

4. The method of claim 1, wherein the optical fiber is irradiated by the UV sources, having an average power of at least 300 W/in.

5. The method of claim 1, wherein the optical fiber is irradiated by the UV sources, having an average power of at least 500 W/in.

6. The method of claim 1, wherein the total residence time of the fiber in the irradiation zone is less than 0.5 seconds.

7. The method of claim 1, wherein the draw speed S is 30 m/sec<S<100 m/sec.

8. The method of claim 7, wherein the draw speed is S is 30 m/sec<S<70 m/sec.

9. The method of claim 1, wherein the fiber is drawn at a draw speed of greater than or equal to 30 m/s.

10. The method of claim 1, said method comprising: drawing the fiber from a heated glass source at a draw speed of greater than or equal to 20 m/s, coating said fiber with at least one optical coating; and irradiating the optical fiber by maintaining the optical fiber in a irradiation zone for a total residence time of between 0.01 and 0.5 seconds.

11. The method of claim 10, wherein the fiber is drawn at a draw speed of greater than or equal to 30 m/s and at a draw tension of between about 25 and 200 grams.

12. The method of claim 1 comprising coating said fiber with a polymerizable coating; and curing said coating by maintaining the optical fiber in the UV irradiation zone, wherein the total length L of the irradiation zone is at least about 2 meters.

13. The method of claim 12, wherein the fiber is drawn at a draw speed of greater than or equal to 30 m/s.

14. The method of claim 12, wherein the total length L of the irradiation zone is at least about 2.4 meters.

15. The method of claim 12, wherein the total length L of the irradiation zone is at least about 2.5 meters.

16. The method of claim 12, wherein the total length L of the irradiation zone is at least about 3 meters.

17. The method according to claim 1 wherein the temperature of the bare fiber entering the fluid bearing is at least 1000° C. and is at least 500° C. or greater than the temperature of the fluid being emitted through and supporting the fiber within the fluid bearing, and wherein said fluid bearing cool the fiber by at least 200° C.

18. The method according to claim 17, further comprising cooling said bare fiber with an additional cooling mechanism, prior to said coating step.

19. The method according to claim 17, wherein no additional cooling mechanism is utilized to cool the bare fiber prior to said coating step.

20. The method according to claim 1, the method further comprises: contacting said optical fiber with a region of said fluid bearing, wherein said fluid bearing comprises a first plate and a second plate, the first and second plates each having an arcuate outer surface, the plates having said sidewalls combining to form the channel region, wherein said channel is tapered at an angle, and wherein each of the plates having a notched portion associated with the arcuate outer surfaces and fluid flows into said channel through the fluid inlet and out of the channel through a fluid outlet, to thereby support said fiber within said channel region during said drawing step, the narrower portion of the channel configured to receive fluid to be transported through said channel, thereby creating high pressure on the fluid inlet side of the channel with respect to the pressure on the fluid outlet side of the channel and thereby cushion and deliver said fiber in an arcuate path through said fluid bearing; and redirecting said optical fiber through said arcuate path and along the second pathway as said optical fiber is drawn across said region of fluid cushion.

21. The method according to claim 1, the method further comprises: contacting said bare optical fiber with the fluid within the channel, said channel defined by two at least substantially parallel sidewalls, the fluid pressure for said fluid being selected and the fiber being retained within a region of said channel between said two sidewalls having a width, the pressure and the width sufficient to cause said fiber to be centered within the channel at least substantially as a result of the Bernoulli effect.

* * * * *